United States Patent
Benck et al.

(10) Patent No.: US 10,994,778 B2
(45) Date of Patent: May 4, 2021

(54) TRACKED VEHICLE WITH STEERING COMPENSATION

(71) Applicants: Steven L. Benck, Elmhurst, IL (US); Andrew C. Wickman, Roscoe, IL (US); John P. Driscoll, Salem, WI (US)

(72) Inventors: Steven L. Benck, Elmhurst, IL (US); Andrew C. Wickman, Roscoe, IL (US); John P. Driscoll, Salem, WI (US)

(73) Assignee: RCE Equipment Solutions, Inc., Rockford, IL (US)

( * ) Notice: Subject to any disclaimer, the term of this patent is extended or adjusted under 35 U.S.C. 154(b) by 323 days.

(21) Appl. No.: 16/228,081

(22) Filed: Dec. 20, 2018

(65) Prior Publication Data

US 2020/0198700 A1    Jun. 25, 2020

(51) Int. Cl.
| | | |
|---|---|---|
| *B62D 11/04* | (2006.01) | |
| *B62D 11/00* | (2006.01) | |
| *B62D 55/06* | (2006.01) | |
| *B60K 26/02* | (2006.01) | |
| *B62D 1/12* | (2006.01) | |
| *B66C 9/00* | (2006.01) | |
| *B66C 23/00* | (2006.01) | |
| *B62D 65/02* | (2006.01) | |
| *E02F 9/22* | (2006.01) | |
| *F15B 11/22* | (2006.01) | |
| *B66C 13/56* | (2006.01) | |
| *B66C 23/36* | (2006.01) | |

(52) U.S. Cl.
CPC ............ *B62D 11/005* (2013.01); *B60K 26/02* (2013.01); *B62D 1/12* (2013.01); *B62D 11/04* (2013.01); *B62D 55/06* (2013.01); *B62D 65/02* (2013.01); *B66C 9/00* (2013.01); *B66C 13/56* (2013.01); *B66C 23/54* (2013.01); *E02F 9/225* (2013.01); *F15B 11/22* (2013.01); *B66C 23/36* (2013.01); *B66C 2700/0378* (2013.01)

(58) Field of Classification Search
CPC ........ B62D 11/005; B62D 1/12; B62D 11/04; B62D 55/06; B60K 26/02; B66C 9/00; B66C 13/56; B66C 23/54; E02F 9/225
See application file for complete search history.

(56) References Cited

U.S. PATENT DOCUMENTS

| | | |
|---|---|---|
| 3,722,707 A | 3/1973 | Hedeen et al. |
| 3,990,583 A | 11/1976 | Nishida et al. |
| 4,166,544 A | 9/1979 | Cecchi et al. |
| 4,277,053 A | 7/1981 | Simon |
| 4,317,524 A | 3/1982 | Andersson |
| 5,222,613 A | 6/1993 | McGhie |
| 5,733,095 A | 3/1998 | Palmer et al. |
| 5,960,970 A * | 10/1999 | Walker .................... B66C 23/36 212/294 |

(Continued)

*Primary Examiner* — Kevin Hurley
*Assistant Examiner* — Michael R Stabley
(74) *Attorney, Agent, or Firm* — Reinhart Boemer Van Deuren P.C.

(57) ABSTRACT

A tracked vehicle includes a pilot control module which enables the pilot to steer the tracked vehicle using an existing joystick of the tracked vehicle. The tracked vehicle also includes a dual track drive pedal which drives the tracks of the vehicle simultaneously. The joystick is used to make steering corrections when utilizing the dual track drive pedal.

20 Claims, 8 Drawing Sheets

(56) References Cited

U.S. PATENT DOCUMENTS

| | | | |
|---|---|---|---|
| 6,003,252 A | 12/1999 | Davis | |
| 6,062,405 A * | 5/2000 | Pech | B66C 23/36 |
| | | | 212/298 |
| 6,280,119 B1 | 8/2001 | Ryan et al. | |
| 6,564,548 B2 | 5/2003 | Nishimura et al. | |
| 6,609,622 B2 | 8/2003 | Forsyth | |
| 6,843,619 B2 | 1/2005 | Gelmi | |
| 6,893,189 B2 | 5/2005 | Matsushita et al. | |
| 7,165,395 B2 * | 1/2007 | Anderson | E02F 9/2207 |
| | | | 60/413 |
| D567,259 S | 4/2008 | Davis | |
| D592,228 S | 5/2009 | Davis | |
| 7,762,923 B2 * | 7/2010 | Schuh | B60T 10/04 |
| | | | 477/92 |
| 7,896,178 B2 | 3/2011 | Davis | |
| 8,069,592 B2 | 12/2011 | Ellett | |
| 8,152,412 B2 | 4/2012 | Davis | |
| 8,424,301 B2 | 4/2013 | Choi et al. | |
| 8,783,477 B2 | 7/2014 | Camacho et al. | |
| 9,120,650 B2 | 9/2015 | Langer et al. | |
| 9,303,761 B2 * | 4/2016 | Storey | B62D 55/06 |
| 9,409,752 B2 | 8/2016 | Sutherland | |
| 9,604,825 B2 | 3/2017 | Avila | |
| 9,663,335 B2 | 5/2017 | Huang et al. | |
| 9,751,732 B2 | 9/2017 | May | |
| 10,113,423 B2 * | 10/2018 | Haisler | E02F 9/2054 |
| 10,246,854 B2 * | 4/2019 | Greer | E02F 3/3414 |
| 2010/0018197 A1 | 1/2010 | Yoo et al. | |
| 2010/0108632 A1 | 5/2010 | Davis | |
| 2014/0236432 A1 * | 8/2014 | Haisler | E02F 9/267 |
| | | | 701/50 |

* cited by examiner

TRACKED VEHICLE WITH STEERING COMPENSATION

FIELD OF THE INVENTION

This invention generally relates to heavy equipment, and more particularly to tracked vehicles, i.e. vehicles having a pair of tracks which are used to convey the vehicle.

BACKGROUND OF THE INVENTION

In underground pipe lying operations, a trench is typically dug, and then sections of pipe are placed therein. In many cases, the length of these sections of pipe is such that multiple construction vehicles such as tracked vehicles are used to place the section of pipe into the trench. The tracked vehicles are typically tracked vehicles with a boom. The boom itself operates in much the same way as a crane in that the pipe is suspended from the boom using specialized pipe carrying means.

As mentioned above, several of these vehicles carry a section of pipe simultaneously. These vehicles slowly lower the section of pipe together into the trench. Because the section of pipe is a rigid structure, the tracked vehicles must move in a synchronized manner. If one vehicles motion is not carefully synchronized the remaining vehicles, the section of pipe can undesirably swing while being carried, can be placed insufficiently in the trench, or worse, may become damaged.

Unfortunately, it is not uncommon for the above undesirable scenarios to unfold. Circumstances can vary, but typically one of the several tracked vehicles moves in an undesired direction off of its intended path due to uneven ground or disturbances. Operators try to correct this but due to the existing steering mechanism in such vehicles, such corrections are difficult to make.

Indeed, these vehicles typically utilize a dual pedal steer system. One pedal controls one of the pair of tracks of the vehicle, and the other pedal controls the other one of the pair of tracks. As is readily known by those in the industry, steering of such tracked vehicles is primarily effectuated by causing one of the pair of tracks to travel at a different speed than the other resulting in a turn in direction to the left or to the right. Making very fine adjustments with such a dual pedal configuration is difficult. Further, making very quick adjustments to right an off course vehicle is also very difficult, especially when carrying a section of pipe.

Efforts have been made to address the above. For example, more modern tracked vehicles used in pipeline applications may use a single pedal mode. In single pedal mode, a separate, single pedal may be used to drive both tracks simultaneously at the same speed. While such a configuration ensures an even speed, all steering functionality is removed. In other words, as the tracks move together, if one track encounters a rock or other encumbrance, its speed relative to the other may be effected. This will cause a slight turn. In single pedal mode, the operator cannot rectify or counteract this slight turn. Ultimately, the above problems will then persist.

Accordingly, there is a need in the art for a tracked vehicle and associated steering system which alleviates above. The invention provides such a vehicle and steering system. These and other advantages of the invention, as well as additional inventive features, will be apparent from the description of the invention provided herein.

BRIEF SUMMARY OF THE INVENTION

In one aspect, the invention provides a tracked vehicle. An embodiment of such a tracked vehicle includes a pair of tracks mounted on a track support structure. The pair of tracks are movable independent of one another to cause movement of the tracked vehicle. This embodiment also includes a vehicle body mounted to the track support structure that includes an operator cabin. A pair of drive pedals are situated in the operator cabin. One of the pair of drive pedals is configured to provide a drive input to one of the pair of tracks. The other one of the pair of drive pedals is configured to provide a drive input to the other one of the pair of tracks. This embodiment also includes a joystick for controlling a function of the tracked vehicle, as well as a pilot control module.

The pilot control module includes a dual track drive pedal configured to provide a drive input to both tracks of the pair of tracks simultaneously. The pilot control module also includes a controller. The dual track drive pedal and joystick are operably coupled to the controller such that the controller receives an input signal from the dual track drive pedal and from the joystick. The pilot control module also includes a plurality of solenoid operated valves in fluid communication with a hydraulic drive system of the tracked vehicle which are controlled by controller.

In embodiments according to this aspect, the input signal provided by the joystick is generated by at least one of a pair of pressure transducers. The pair of pressure transducers are configured to detect the input signal from the joystick of the tracked vehicle.

In embodiments according to this aspect, the plurality of solenoid operated valves are in fluid communication with a main control valve of the tracked vehicle for controlling a distribution of hydraulic fluid power to each one of the pair of tracks from the hydraulic drive system. Manipulation of the joystick produces a steering movement in the pair of tracks.

In embodiments according to this aspect, the tracked vehicle also includes a plurality of isolation check valves connected, respectively, to an outlet of each one of the plurality of solenoid operated valves. The plurality of isolation check valves includes four isolation check valves. Two of said four isolation check valves are connected to one of the pair of drive pedals. The other two of said four isolation check valves are connected to the other one of the pair of drive pedals.

In embodiments according to this aspect, the pair of tracks includes a first track and a second track, and the plurality of solenoid operated valves includes four solenoid operated valves. A first and a second one of the four solenoid operated valves are associated with the first track for controlling a direction of travel of the first track. A second and a third one of the four solenoid operated valves are associated with the second track for controlling a direction of travel of the second track.

In another aspect, the invention provides a pilot control module for a tracked vehicle. The tracked vehicle includes a pair of tracks movable independent of one another to cause movement of the tracked vehicle and a pair of drive pedals. The pair of drive pedals are configured to provide a drive input to the pair of tracks to effectuate movement of the tracked vehicle. The tracked vehicle also includes a joystick for controlling a function of the tracked vehicle.

An embodiment of the pilot control module includes a dual track drive pedal configured to provide a drive input to both tracks of the pair of tracks simultaneously and a pair of pressure transducers configured to detect the input signal from the joystick of the tracked vehicle. This embodiment also includes a controller. The dual track drive pedal and pair of pressure transducers are coupled to the controller. The controller receives an input signal from the dual track drive pedal and input signals from the pair of pressure transducers.

This embodiment also includes plurality of solenoid operated valves in fluid communication with a hydraulic drive system of the tracked vehicle. The plurality of solenoid operated valves are controlled by the controller such that the controller provides outputs signal to select ones of the plurality of solenoid operated valves to set an operational position of said select ones of the plurality of solenoid operated valves based on the input signals received from the dual track drive pedal and from the pressure transducers.

In embodiment according to this aspect, the plurality of solenoid operated valves are in fluid communication with a main control valve of the tracked vehicle for controlling a distribution of hydraulic fluid power to each one of the pair of tracks from the hydraulic drive system such that manipulation of the joystick produces a steering movement in the pair of tracks.

In embodiment according to this aspect, the pilot control module also includes a mode switch for toggling between a joystick steer off mode, and a joystick steer on module. The controller provides the output signal only in the joystick steer on mode. In one embodiment according to this aspect, the mode switch is the dual track drive pedal wherein manipulation of said dual track drive pedal toggles from the joystick steer off mode to the joystick steer on mode. In another embodiment according to this aspect, the mode switch is a user manipulated switch separate from the dual track drive pedal.

In embodiments according to this aspect, the controller is configured to only send the output signals based on the input signals from the pair of pressure transducers if said input signals from said pair of pressure transducers are received subsequently and concurrently with the input signal from the dual track drive pedal.

In yet another aspect, the invention provides a method of installing a pilot control module in a tracked vehicle. The tracked vehicle includes a pair of tracks movable independent of one another to cause movement of the tracked vehicle and a pair of drive pedals. The pair of drive pedals are configured to provide a drive input to the pair of tracks to effectuate movement of the tracked vehicle. The tracked vehicle also includes a joystick for controlling a function of the tracked vehicle.

An embodiment of a method according to this aspect includes installing a pair of pressure transducers such that they detect a pressure input generated by a movement of the joystick and produce a corresponding input signal. This embodiment also includes installing a controller, said controller operably connected to the pair of pressure transducers to receive the input signal produced by said pressure transducers. This embodiment also includes associating the controller with a dual track drive pedal. The dual track drive pedal is operably connected to the controller such that the controller receives an input signal produced by the dual track drive pedal.

This embodiment also includes installing a plurality of solenoid operated valves such that the solenoid operated valves are in fluid communication with a hydraulic drive system of the tracked vehicle. The plurality of solenoid operated valves are in fluid communication with a main control valve of the tracked vehicle for controlling a distribution of hydraulic fluid power to each one of the pair of tracks from the hydraulic drive system such that manipulation of the joystick produces a steering movement in the pair of tracks.

In embodiments according to this aspect, the step of installing the pair of pressure transducers includes disabling an existing function of the joystick.

In embodiment according to this aspect, the step of associating the controller with a dual track drive pedal includes installing said dual track drive pedal in the tracked vehicle. In embodiments according to this aspect, the step of associating the controller with a dual track drive pedal includes connecting the controller to a pre-existing dual track drive pedal.

In an embodiment according to this aspect, the method also includes installing a plurality of isolation check valves such that each one of the plurality of isolation check valves is connected downstream from an outlet of each one of the plurality of solenoid operated valves, respectively.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, the illustrated embodiments depict a tracked vehicle and its associated steering module in accordance with the teachings of the invention. It is contemplated by the teachings herein that the invention may be embodied as a tracked vehicle which includes a steering module allowing an operator to utilize a hand control, e.g. a joystick, to provide steering compensation when using a dual track drive pedal.

It is also contemplated by the teachings herein that the invention may be embodied as a pilot control module which provides the aforementioned steering functionality. Such a module may be readily installed in an existing vehicle with only minor alterations to such an existing vehicle. Accordingly, it is also contemplated by the teachings herein that the invention may be embodied as a method of retrofitting an existing tracked vehicle such that a hand control may be used for steering compensation.

Figure 1:
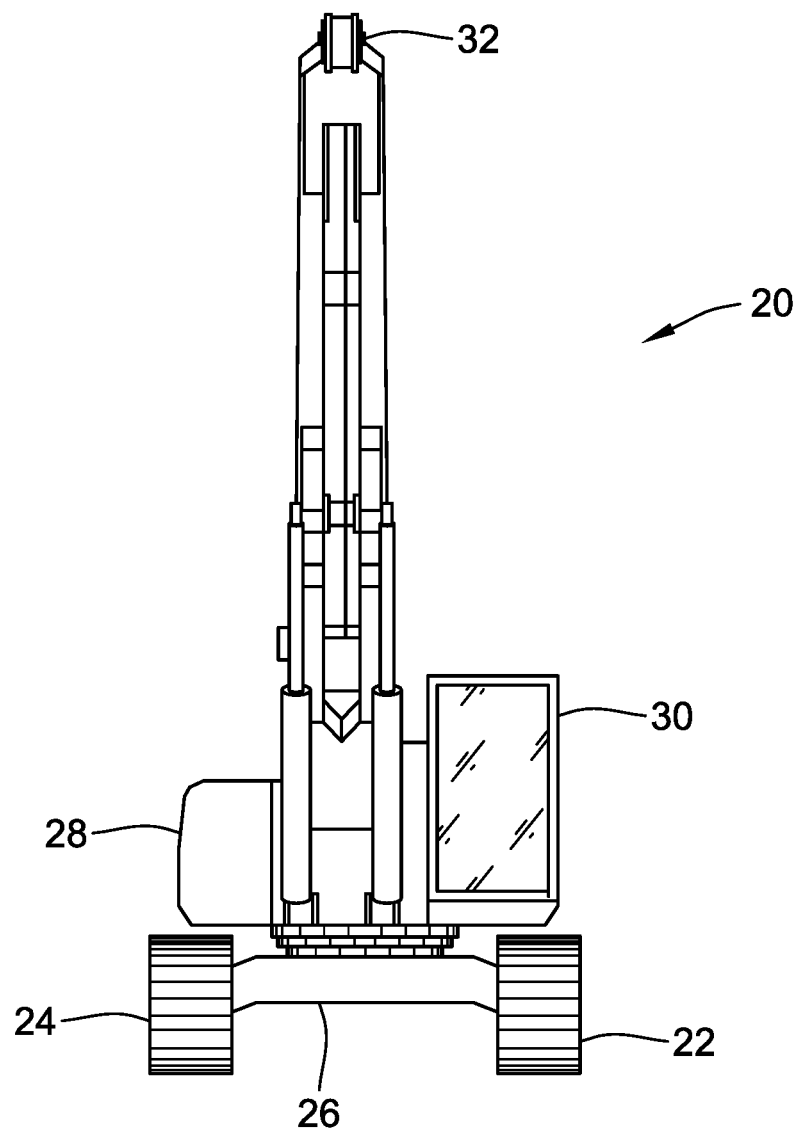
FIG. 1 is a front view of an exemplary embodiment of a tracked vehicle incorporating a steering module, according to the teachings herein.

Turning now to FIG. 1, the same illustrates a front view of a tracked vehicle 20 constructed in accordance with the teachings herein. Tracked vehicle 20 includes a pair of tracks 22, 24 which are mounted to a track structure 26. Track structure includes all of the hardware and mounting structure necessary to receive and support a vehicle body 28 thereon. As may be readily appreciated, vehicle body 28 includes an operator cabin 30, and is rotatable 360° relative to track structure 26 and tracks 22, 24. This allows an operator within operator cabin 30 to orient a boom 32 in any desired direction relative to track support structure 26 and tracks 22, 24.

Figure 2:
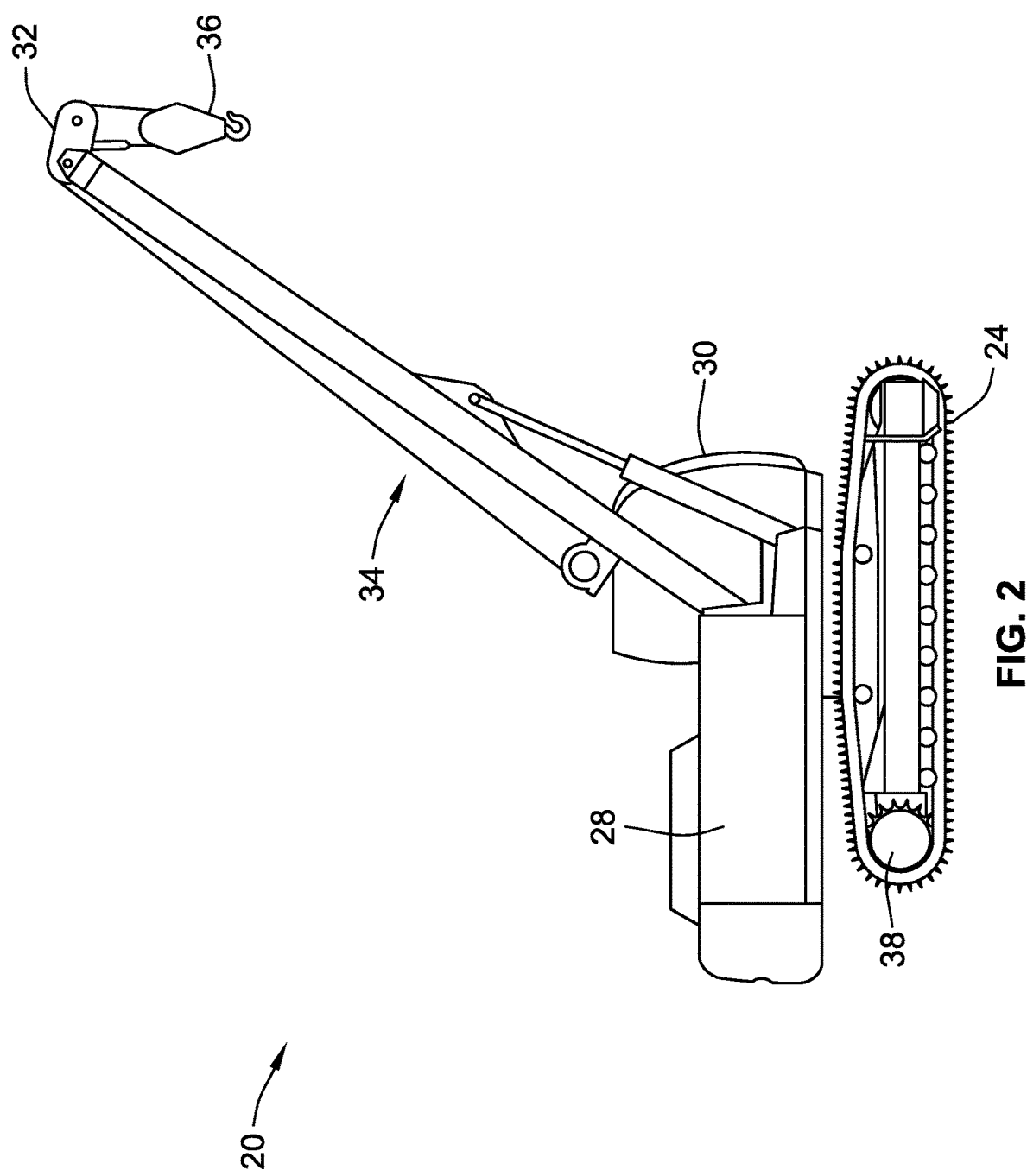
FIG. 2 is a side view of the tracked vehicle of FIG. 1.

Turning now to FIG. 2, support structure 26 also includes the hardware and mounting structure necessary to receive, support, and facilitate the operation of tracks 22, 24. Such hardware may for example include drive motors (discussed below), drive sprockets 38, idler wheels, track tensioning arms, etc. Tracks 22, 24 may take the form of any contemporary tracks used for tracked vehicles.

Boom 32 includes a winch assembly 34 which terminates in an end effector 36. In the illustrated embodiment, the end effector 36 is a tackle block style hook, but any other end effector may be employed. Winch assembly 34 is operable to raise and lower end effector 36 as desired. Boom 32 is itself capable of being raised and lowered as well, providing a high degree of flexibility in load management and movement.

The above-introduced tracked vehicle 20 is ideal for pipe laying operations. Indeed, cradling or other structures may be attached to end effector 36 to support a section of pipe. Boom 32 and winch assembly 34 may be operated to place this supported section of pipe in a desired location.

With continued reference to FIG. 2, movement of tracked vehicle 20 from left to right in FIG. 2 is considered movement in the forward direction. Put differently, movement in the forward direction is that direction of travel in which the end of tracks 22, 24 which does not include sprocket 38 is the leading end of tracks 22, 24 relative to the direction of travel. Movement in the reverse direction is from right to left in FIG. 2 and is that direction of travel in which the end of tracks 22, 24 which does include sprocket 38 is the leading end of tracks 22, 24 relative to the direction of travel.

Similarly, vehicle body 30 is said to be facing in the forward direction when it is facing in the forward direction of travel of tracks 22, 24, as well any angular position that is between plus or minus 90° from this forward direction of travel. Vehicle body is said be facing in the reverse direction when it is facing in the reverse direction of travel of tracks 22, 24, as well any angular position that is between plus or minus 90° from this reverse direction of travel.

Figure 3:
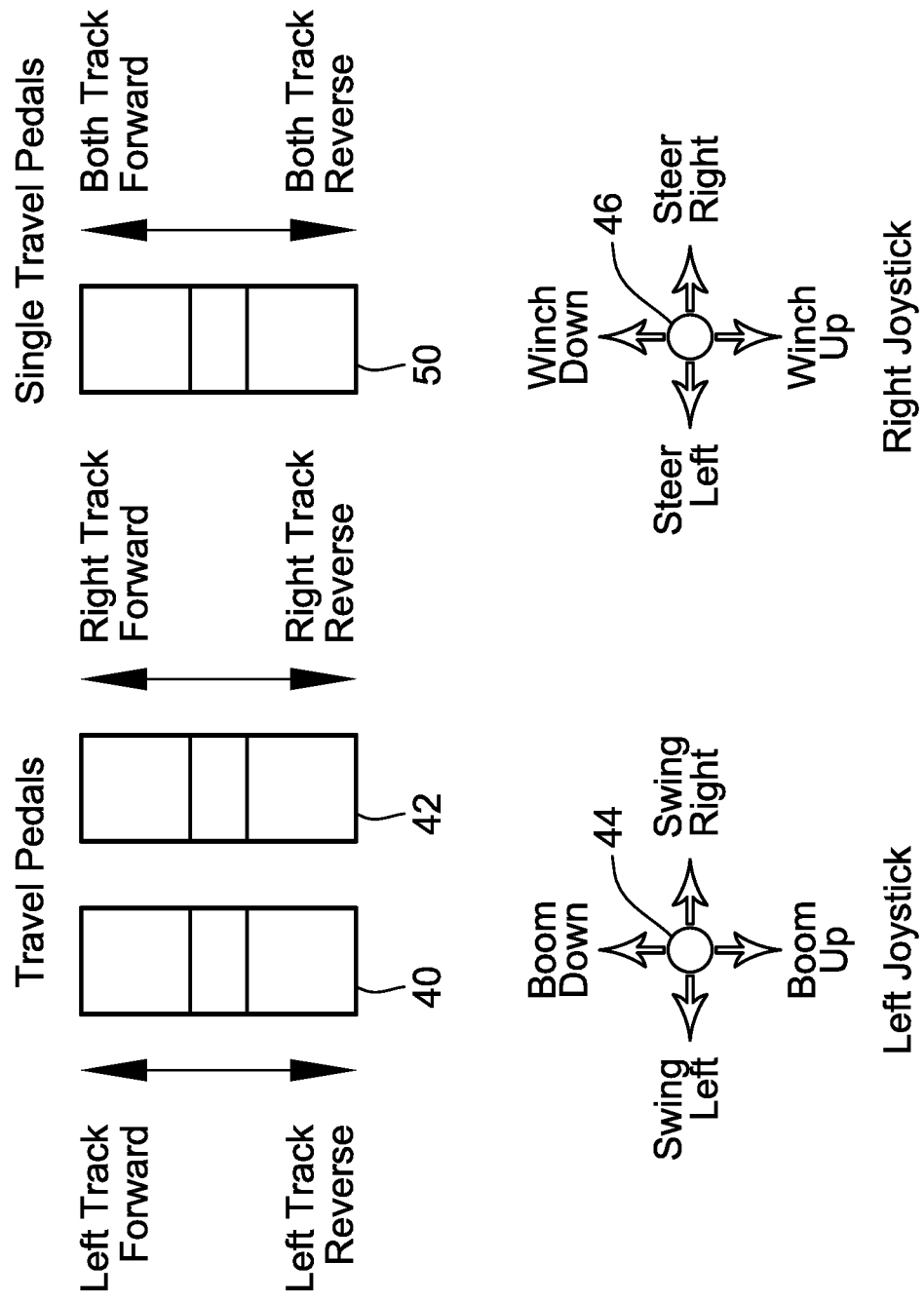
FIG. 3 is a schematic illustration of a pilot control configuration of the tracked vehicle of FIG. 1.

Turning now to FIG. 3, the same illustrates a schematic view of the operator controls within operator cabin 30. These controls include the conventional dual pedals 40, 42 used for both moving tracked vehicle linearly, and for steering. Pedal 40 is associated with track 22, while pedal 42 is associated with track 24. As is readily appreciated by those of skill in the art, pedals 42, 44 may be used to provide a drive input to their associated track 22, 24. "Drive input" as used herein means the necessary signal from the user control side required for producing a drive output at the tracks. Accordingly, this signal may be communicated through multiple components, e.g. hydraulics, valving, etc., and may be communicated via a single or combination of mediums, e.g. hydraulics, electrical componentry, mechanical componentry.

In a typical embodiment of such a drive input, each pedal 40, 42, operates upon a hydraulic valve associated with a hydraulic drive system of the tracked vehicle, which in turns produces an output signal in the form of a hydraulic pressure. This hydraulic pressure is communicated via the hydraulic drive system of the vehicle to ultimately produce a desired output at the associated track. The hydraulic drive system includes all of the typical componentry used for a hydraulic system of tracked vehicle, e.g. pumps, tanks, valves, sensors, flow control devices, pressure control devices, etc.

The aforementioned operator controls 30 also include a dual track drive pedal 50. Dual track drive pedal 50 provides a drive input to both tracks 22, 24 simultaneously. As will be appreciated by those of skill in the art, this dual track drive pedal is easier to manipulate the both pedals 40, 42, when it is desirable to produce an identical output at both tracks 22, 24 simultaneously. Such a dual track drive pedal 50 is particularly advantageous for moving tracked vehicle 20 forward or reverse along a straight path.

Still referring to FIG. 3, the aforementioned operator controls also include a pair of hand controls in the form of joystick 44, 46. Joystick 44 may include four functions associated with its four principle directions of movement (forward, back, left, right). As schematically shown in FIG. 3, forward and back on joystick 44 move boom 32 up and down, respectively. Left and right on joystick 44 rotate, i.e. swing, vehicle body 28 to the left and right, respectively.

Joystick 46 also includes four functions associated with its four principle directions. Indeed, forward and back are used to pay out or take up the cable of winch assembly 34. Left and right are used to produce a steering movement in the pair of tracks 22, 24. "Steering movement" a used herein means an operation of tracks 22, 24 which causes tracked vehicle 20 to deviate from its current direction of travel. For example, a steering movement may include slowing or stopping the rotation of one track relative to the other track as tracked vehicle 20 is moving forward so as to cause tracked vehicle 20 to deviate left or right from its current straight direction of travel. Ultimately, this causes tracked vehicle 20 to turn.

It should be noted that, except for the left and right steer functions of joystick 46, the functions of joysticks 44, 46 will be dependent upon the type of tracked vehicle they are associated with. As such, the foregoing functions other than the left and right steering functions should be considered exemplary only.

It should also be noted that, given the modular nature of the invention, right joystick 46 may have pre-existing functions associated with its left and right principle direction. These functions are disabled, disconnected, or otherwise overridden to allow for the steering functionality described herein.

Indeed, of the above discussed operator controls, most contemporary pre-existing tracked vehicles will already include a pair of drive pedals 40, 42, and a right and left joystick 44, 46. The modular nature of the invention advantageously requires only minor alteration of one of the existing joysticks to add the above-introduced right and left steer functions, the dual track drive pedal 50, and the remaining componentry discussed below to effectuate the functionality of these components.

Alternatively, it is also envisioned that some contemporary pre-existing tracked vehicles may also already include a dual track drive pedal. In such an instance, the modular nature of the invention requires only connecting to this dual track drive pedal as discussed below, alteration of one of the existing joysticks to add the above-introduced right and left steer functions, and providing the remaining componentry discussed below to effectuate the functionality of these components.

Figure 4:
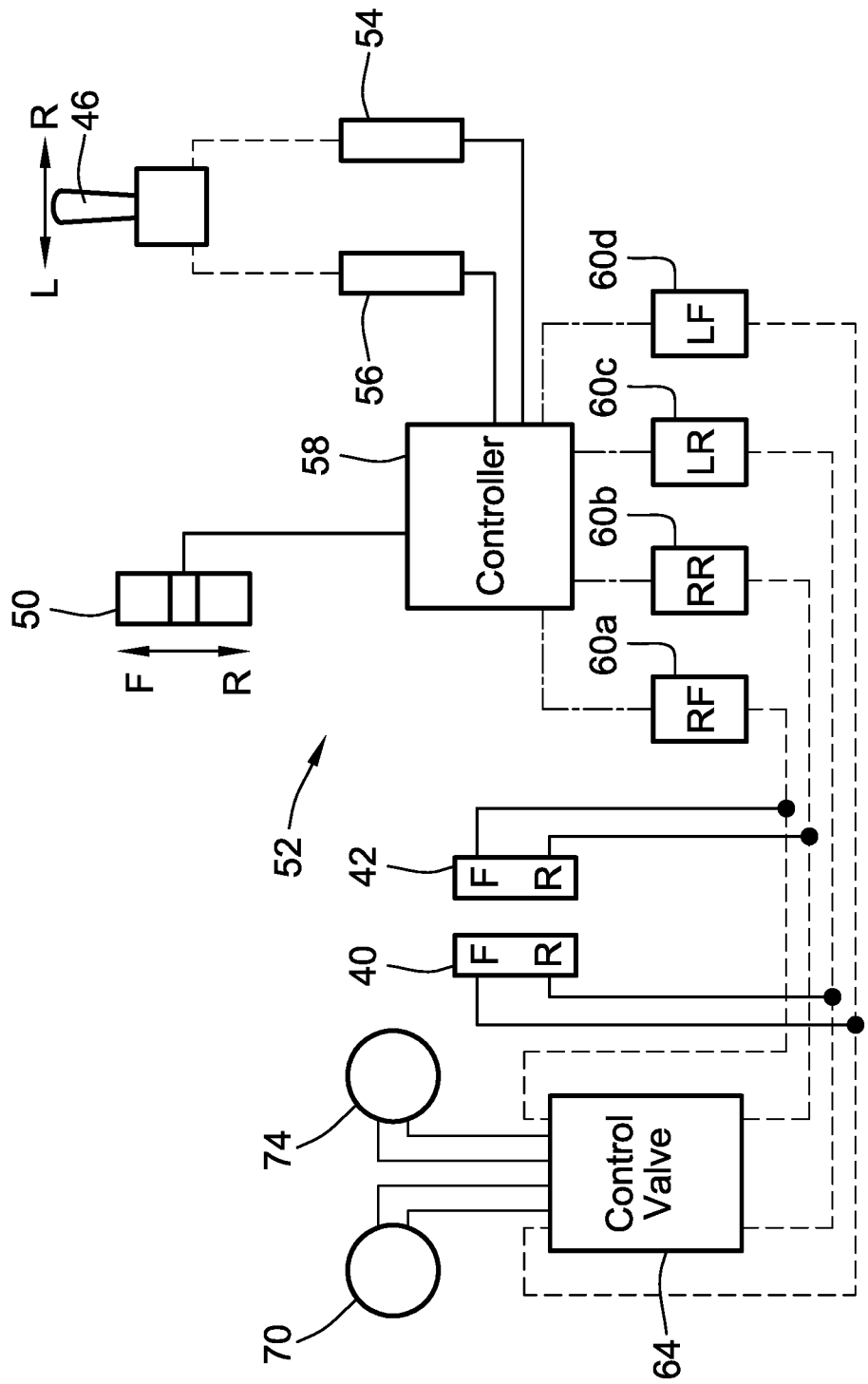
FIG. 4 is a schematic representation of a pilot control module of the tracked vehicle of FIG. 1.

Turning now to FIG. 4, as mentioned above, the invention may be embodied as a pilot control module 52 which may be retrofit to an existing tracked vehicle. Such a steering module 52 includes a pair of transducers 54, 56, a controller 58, a plurality of solenoid operated valves (referred to herein simply as "valves") 60a, 60b, 60c, 60d, and optionally, a dual track drive pedal 50 where one is not already present. As described below, these components operate upon an existing hydraulic drive system to ultimately produce a desired movement of tracked vehicle 20.

As shown in FIG. 4, the aforementioned hydraulic drive system includes a main control valve 64 which selectively communicates hydraulic fluid power via high pressure lines to left and right track motors 70, 74 associated respectively with left and right tracks 22, 24. Each track motor 70, 74 is responsible for governing the direction of movement, i.e. forward or reverse, of its respective track 22, 24. To accomplish this, drive motors 70, 74 are directly or indirectly connected to drive sprockets 38 shown in FIG. 2.

Pedals 40, 42 communicate with control valve 64 via the hydraulic connections shown to govern the operation of track motors 70, 74. Not shown in this view is the remainder of the hydraulic drive system which provides the pressure along these hydraulic connections connecting to control valve 64. As already mentioned, the remainder of the hydraulic drive system includes all of the necessary componentry typically utilized in tracked vehicles utilizing a hydraulic drive scheme. Pedals 40, 42 produce a drive input in the form of a pressure input provided via these lines to control valve 64, which in turn is used to produce the direction of movement in tracks 22, 24.

From the above description, it may be readily appreciated that control valve 64 receives four pressure inputs. A first and a second input are associated with the forward and reverse depression of pedal 40, while a third and a fourth input are associated with the forward and reverse depression of pedal 42. As will be explained in greater detail below, valves 60a-60d are used to manipulate these four pressure inputs to ultimately control tracks 22, 24.

Pilot control module 52 utilizes each one of valves 60a-60b also produce a drive input in the form of input pressure provided via these lines to control valve 64, which in turn is used to produce the direction of movement in tracks 22, 24. As will be described below relative to FIG. 5, whichever pressure is greater between the pressure from pedals 40, 42 and valves 60a-60d will be the pressure seen by control valve 64.

The operation of valves 60a-60d, particularly their operational positions which govern the pressure input produced thereby, is governed by controller 58. Controller 58 includes all the hardware, software, and firmware necessary to achieve the functionality described herein. Controller 58 may also employ feedback loop control to ensure that valves 60a-60d are producing the desired input pressure. While contemplated as being embodied as a separate controller, it is also envisioned that controller 58 may be purely software based, and installed on an existing vehicle controller already present.

Controller 58 receives electrical input signals from dual track drive pedal 50, as well as transducers 54, 56. Turning first to dual track drive pedal 50, the input signal provided to controller 58 may be produced by a position sensor which senses the position of dual track pedal 50 and converts that position information into a voltage signal. Any other means typically employed with electronic drive pedals may be employed.

With regard to transducers 54, 56, transducer 54 is associated with the right principle direction of joystick 46. Likewise, transducer 56 is associated with the left principle direction of joystick 46. Movement of joystick 46 left or right produces a corresponding pressure input in the hydraulic drive system. This pressure input is sensed by transducers 54, 56, and then converted into an input signal that is received at controller 58.

Controller 58 in turn is operable to interpret the input signals received from dual track drive pedal 50 and transducers 54, 56, and adjusts an operational position of one or more of valves 60a-60d to ultimately produce a corresponding output at tracks 22, 24.

Controller 58 is also configured to ignore any input signal from transducers 54, 56 unless this input signal is received subsequently after and concurrently with an input signal from dual track drive pedal 50. This ensures that steering inputs provide by joystick 46 may only cause any steering movements after dual track drive pedal has first been actuated, and continues to be actuated, while joystick 46 is manipulated. In this way, dual track drive pedal 50 functions as a mode switch which switches the system from a joystick steer off mode, where steering inputs at joystick 46 have no effect, to a joystick steer on mode, where steering inputs at joystick 46 produce steering movements at tracks 22, 24.

Alternatively, it is also envisioned that such a mode switch may be a separate user manipulated control such as a switch in communication with controller 58. In either case, however, steering inputs at joystick 46 will not produce steering movements unless the input signals from transducers 54, 56 are received subsequently from, and concurrently with, depression of drive pedal 50.

As one non-limiting example, the controller may monitor the signal from dual track drive pedal. If controller 58 sees 2.5 volts, it recognizes that the operator does not want tracked vehicle 20 to move. If controller 58 sees greater than 2.7 volts to 4.8 volts, controller 58 will send amperage to right and left forward valves 60a, 60d which then creates the above discussed pressure input at control valve 64, ultimately causing both tracks 22, 24 to travel in the same direction of travel, particularly forward, at the same speed. The speed of the travel of tracks 22, 24 is determined by the input voltage from dual track drive pedal 50. The speed is variable between the slowest speed of 2.7 volts, and max travel speed is at 4.8 volts. If the controller sees 2.3 to 0.2 volts, the controller sends the same signals to right and left reverse valves 60b, 60c for reverse travel.

Once tracked vehicle 20 is in motion, the operator can use joystick 46 to steer. Transducers 54, 56 read the pressure inputs from left and right movement of joystick 46, and report this information to controller 58. Controller 58 can reduce the amperage to one of the two valves currently causing forward motion, causing that associated track to slow, resulting in a steering movement of tracked vehicle 20.

As mentioned above, if joystick 46 is moved prior to dual track drive pedal 50 being activated, tracked vehicle 20 will not turn until the operator releases joystick 46 and then moves it again. In other words, controller 58 is operable to control each of valves 60a-60d to produce a desired steering movement. The particular valves 60a-60d which are controlled by controller 58 will dynamically change depending upon whether tracked vehicle 20 is traveling forward, or traveling in reverse.

Figure 5:
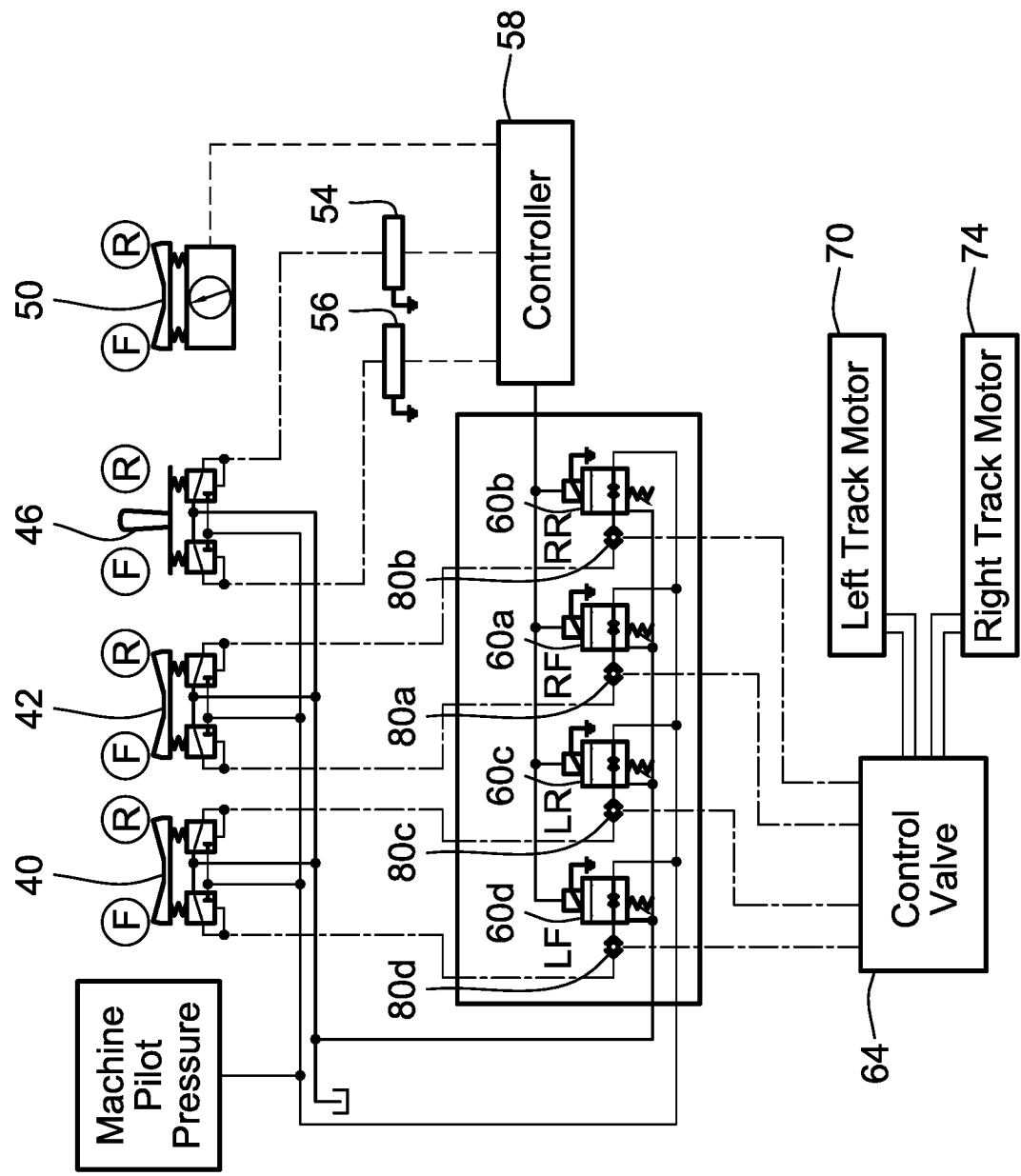
FIG. 5 is another schematic representation of the pilot control module of FIG. 4.

Turning now to FIG. 5, the same illustrates a schematic view of the above described arrangement. Pedals 40, 42, joystick 46, and valves 60a-60d are each connected to the main pilot pressure line of the hydraulic supply system, as well as to the pilot tank lines of the system. Dual track drive pedal 50, transducers 54, 56, and valves 60a-60d are all connected to controller 58 as shown. Each of pedals 40, 42 produces one of two possible pressure inputs (one for depression of the pedal in the forward direction, and one for depression of the pedal in the reverse direction) received by control valve 64 via its hydraulic componentry schematically represented. This pressure input Control valve 64 then delivers a pressure input to track motors 70, 74 via high pressure lines as indicated. When not utilizing the joystick steering functionality as described herein, the preceding operation of pedals 40, 42 is the conventional way to drive and steer tracked vehicle 20.

However, when utilizing the joystick steering functionality as described herein, valves 60a-60d are utilized to produce pressure inputs received by control valve 64 via the hydraulic componentry of valves 60a-60d schematically illustrated. Control valve 64 then delivers a pressure input to track motors 70, 74 via high pressure lines as indicated.

As already mentioned the operation of these valves 60a-60d is controlled by controller 58. More particularly, valves 60a-60d are solenoid operated valves whose solenoids are electrically coupled to controller 58 as shown. Control of the operational position of each valve 60a-60d is thus achieved via control of the valve's associated solenoid. The control of valves 60a-60d is based on the input signals received from transducers 54, 56 and dual track drive pedal 50 as shown.

As may be seen in FIG. 5, a plurality of isolation check valves 80a, 80b, 80c, 80d are associated respectively with valves 60a-60d, such that each valve 60a, 60b, 60c, 60d has one associated isolation check valve 80a, 80b, 80c, 80d. These isolation check valves 80a-80d are situated downstream from the outlets of pedals 40, 42 and the outlets of valves 60a-60d as shown.

Each isolation check valve is connected such that it receives one of the pressure inputs from pedals 40, 42, as well as the pressure input provide by its associated valve 60a-60d, thus receiving two inputs in total. More particularly, isolation check valve 80a receives the pressure input from pedal 42 corresponding to forward depression of this pedal and the pressure input from valve 60a. Isolation check 80b receives the pressure input from pedal 42 corresponding to reverse depression of this pedal and the pressure input from valve 60b. Isolation check 80c receives the pressure input from pedal 40 corresponding to reverse depression of this pedal and the pressure input from valve 60d. Isolation check 80d receives the pressure input from pedal 40 corresponding to forward depression of this pedal and the pressure input from valve 60d.

Each isolation check valve 80a-80d allows the greater of the two pressure inputs it receives to be communicated to control valve 64. In this way, it is possible to override a steering command provided via a pressure input from valves 60a-60d by producing a greater pressure input at pedals 40, 42.

Figure 6:
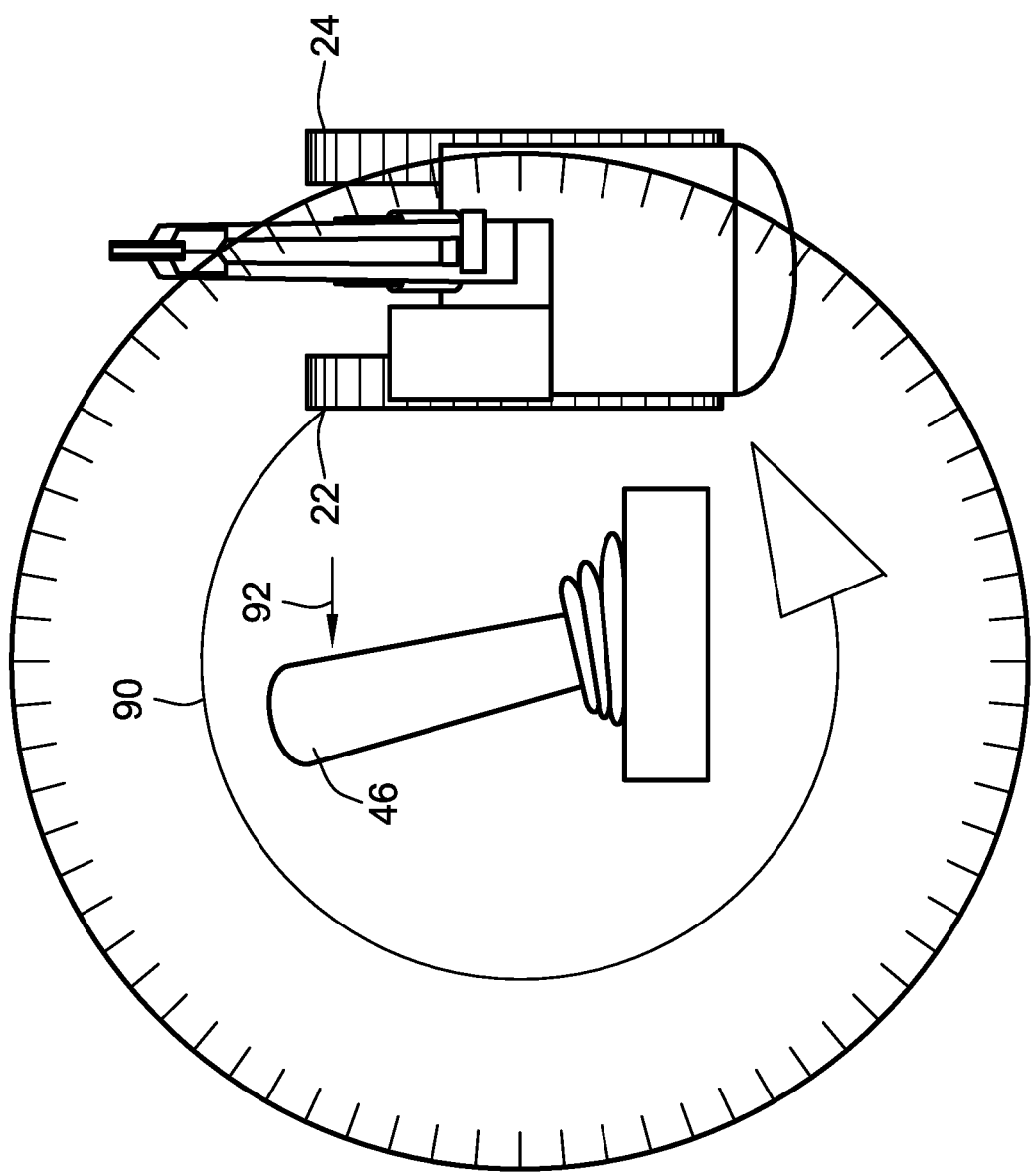
FIG. 6 is a schematic representation of a steering scheme of the tracked vehicle of FIG. 1.
Figure 7:
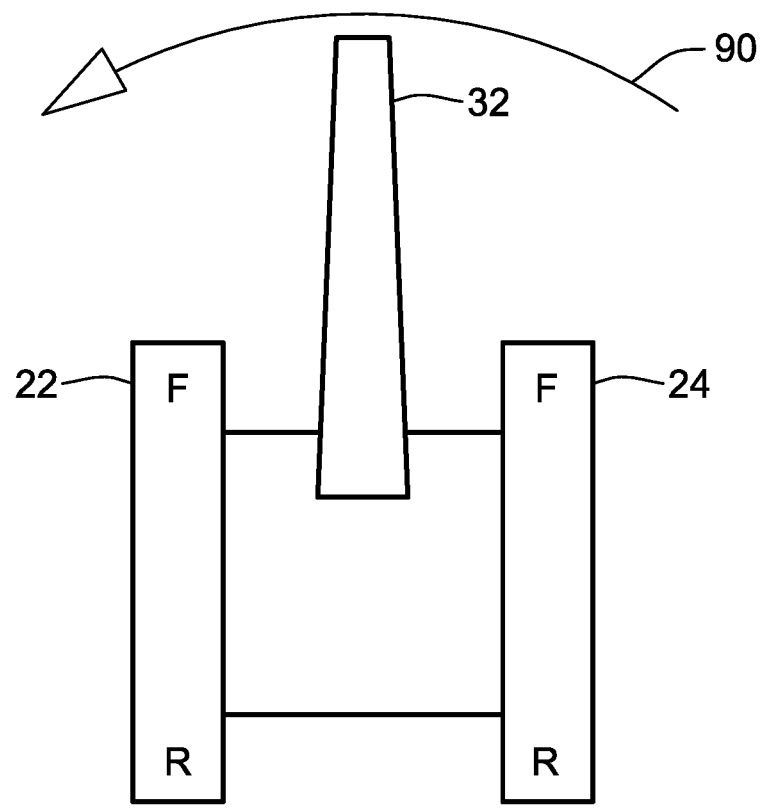
FIGS. 7 and 8 are additional schematic representations of the steering scheme of FIG. 6.
Figure 8:
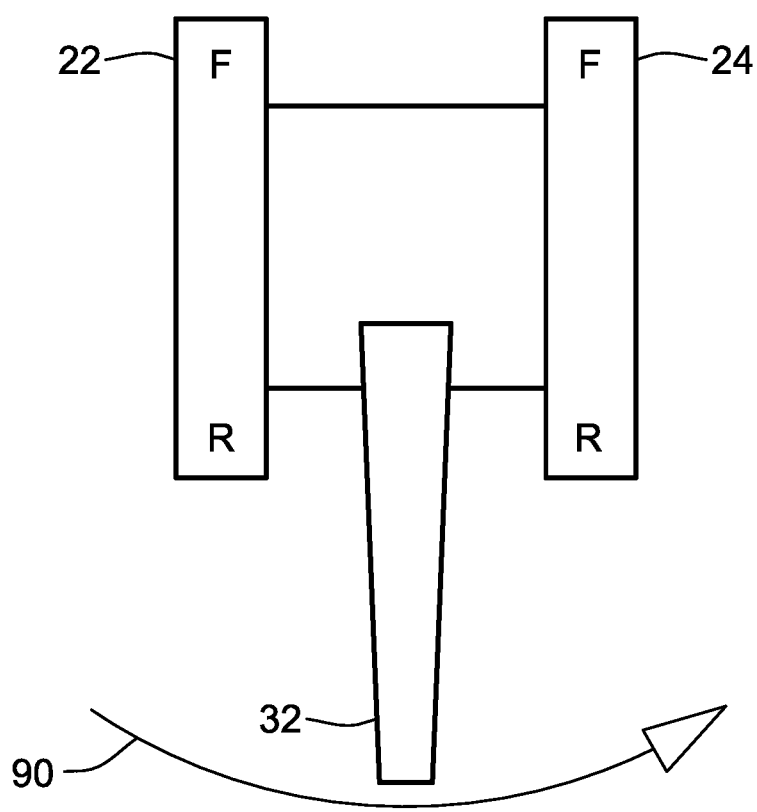

Turning now to FIGS. 6-8, turning joystick 46 to the left will always produce a turn of boom 32 to the operator's left. This configuration is schematically represented in FIG. 6. Movement of joystick 46 in direction 92 causes tracked vehicle 20 to turn in direction 90, i.e. to the operator's left. To achieve this, one of tracks 22, 24 is slowed, via manipulating its associated valve 60a-60d by controller 58 via controller sending an output signal to these valves 60a-60d.

More particularly, and with reference to FIG. 7, if tracked vehicle 20 is travelling forward with vehicle body 28 facing the forward direction and the operator moves joystick 46 to the left, tracked vehicle 20, and hence boom 32 and any load carried thereby, will turn to the operator's left (direction 90) by reducing the pressure input provided by valve 60d thereby slowing down track 22 relative to track 24. If tracked vehicle 20 is moving in the forward direction with vehicle body 28 facing the forward direction and the operator moves joystick 46 to the right, boom 32 will turn to the operator's right (opposite direction 90) by reducing the pressure input provided by valve 60a thereby slowing down track 24 relative to track 22.

It may thus be inferred from FIG. 7 that if tracked vehicle 20 is traveling in the reverse direction with vehicle body 28 facing the forward direction and the operator moves joystick 46 to the left, boom 32 will turn to the operator's left by reducing the pressure input provide by valve 60b thereby slowing down track 24 relative to track 22. If tracked vehicle 20 is traveling in the reverse direction with vehicle body 28 facing the forward direction and the operator moves joystick 46 to the right, boom 32 will move to the operator's right by reducing the pressure input provided by valve 60c thereby slowing down track 22 relative to track 24.

Turning now to FIG. 8, if tracked vehicle 20 is traveling in the reverse direction with vehicle body 28 facing the reverse direction and the operator moves joystick 46 to the left, boom 32 will turn to the operator's left (direction 90) by reducing the pressure input provide by valve 60b thereby slowing down track 24 relative to track 22. If tracked vehicle 20 is traveling in the reverse direction with vehicle body 28 facing the reverse direction and the operator moves joystick 46 to the right, boom 32 will move to the operator's right (opposite direction 90) by reducing the pressure input provided by valve 60c thereby slowing down track 22 relative to track 24.

It may thus be inferred from FIG. 8 that if tracked vehicle 20 is traveling in the forward direction with vehicle body 28 facing the reverse direction and the operator moves joystick 46 to the left, boom 32 will turn to the operator's left by reducing the pressure input provide by valve 60b thereby slowing down track 24 relative to track 22. If tracked vehicle 20 is traveling in the forward direction with vehicle body 28 facing the reverse direction and the operator moves joystick 46 to the right, boom 32 will move to the operator's right by reducing the pressure input provided by valve 60c thereby slowing down track 22 relative to track 24.

From the foregoing description relative to FIGS. 6-8, it will be recognized that controller 58 is operable to control valves 60a-60d based upon the direction of travel of tracked vehicle 20, as detected by the input signal received from dual track drive pedal 50. Indeed, when traveling forward with vehicle body 28 facing forward, a left turn is effectuated by changing the operational position of valve 60d and hence the pressure input it provided to control valve 64. When traveling reverse with vehicle body 28 facing in the reverse direction, a left turn is effectuated by changing an operational position of valve 60b and hence the pressure input it provides to control valve 64.

As mentioned above, operator control module 52 may be readily retrofit into an existing tracked vehicle. Assuming hypothetically that tracked vehicle 20 began as a pre-existing tracked vehicle with a pair of drive pedals 40, 42, and a joystick for controlling a function, retrofitting is relatively straight forward. The existing function for the left and right principle directions of joystick 46 are disabled. Transducers 54, 56 are installed to detect the pressure inputs generated by joystick 46. These transducers are connected to controller 58 which is also installed in tracked vehicle 20.

Dual track drive pedal 50 is also installed and connected to controller 58. In those configurations already including a dual track drive pedal, the same is simply connected to controller 58. Valves 60a-60d are also installed such that they can provide pressure inputs to the existing control valve 64 of the existing hydraulic drive system by manipulating the pressures in this hydraulic drive system as described above.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A tracked vehicle, comprising:
    a pair of tracks mounted on a track support structure, the pair of tracks movable independent of one another to cause movement of the tracked vehicle;
    a vehicle body mounted to the track support structure, the vehicle body including an operator cabin;
    a pair of drive pedals in the operator cabin, wherein one of the pair of drive pedals is configured to provide a drive input to one of the pair of tracks, and wherein the other one of the pair of drive pedals is configured to provide a drive input to the other one of the pair of tracks;
    a joystick for controlling a function of the tracked vehicle;
    a pilot control module, the pilot control module comprising:
        a dual track drive pedal, the dual track drive pedal configured to provide a drive input to both tracks of the pair of tracks simultaneously;
        a controller, the dual track drive pedal and joystick operably coupled to the controller such that the controller receives an input signal from the dual track drive pedal and from the joystick; and
        a plurality of solenoid operated valves in fluid communication with a hydraulic drive system of the tracked vehicle, said solenoid operated valves being controlled by said controller.

2. The tracked vehicle of claim 1, wherein the input signal provided by the joystick is generated by at least one of a pair of pressure transducers.

3. The tracked vehicle of claim 2, wherein the pair of pressure transducers are configured to detect the input signal from the joystick of the tracked vehicle.

4. The tracked vehicle of claim 1, wherein the plurality of solenoid operated valves are in fluid communication with a main control valve of the tracked vehicle for controlling a distribution of hydraulic fluid power to each one of the pair of tracks from the hydraulic drive system.

5. The tracked vehicle of claim 4, wherein manipulation of the joystick produces a steering movement in the pair of tracks.

6. The tracked vehicle of claim 1, further comprising a plurality of isolation check valves connected, respectively, to an outlet of each one of the plurality of solenoid operated valves.

7. The tracked vehicle of claim 6, wherein the plurality of isolation check valves includes four isolation check valves, wherein two of said four isolation check valves are connected to one of the pair of drive pedals, and the other two of said four isolation check valves are connected to the other one of the pair of drive pedals.

8. The tracked vehicle of claim 1, wherein the pair of tracks includes a first track and a second track, and wherein the plurality of solenoid operated valves includes four solenoid operated valves.

9. The tracked vehicle of claim 8, wherein a first and a second one of the four solenoid operated valves are associated with the first track for controlling a direction of travel of the first track, and wherein a second and a third one of the four solenoid operated valves are associated with the second track for controlling a direction of travel of the second track.

10. A pilot control module for a tracked vehicle, the tracked vehicle having a pair of tracks movable independent of one another to cause movement of the tracked vehicle and a pair of drive pedals, wherein the pair of drive pedals are configured to provide a drive input to the pair of tracks to effectuate movement of the tracked vehicle, the tracked vehicle also including a joystick for controlling a function of the tracked vehicle, the pilot control module comprising:
    a dual track drive pedal, the dual track drive pedal configured to provide a drive input to both tracks of the pair of tracks simultaneously;
    a pair of pressure transducers, the pair of pressure transducers configured to detect the input signal from the joystick of the tracked vehicle;
    a controller, the dual track drive pedal and pair of pressure transducers coupled to the controller, the controller receiving an input signal from the dual track drive pedal and input signals from the pair of pressure transducers;

a plurality of solenoid operated valves in fluid communication with a hydraulic drive system of the tracked vehicle, the plurality of solenoid operated valves controlled by the controller such that the controller provides outputs signal to select ones of the plurality of solenoid operated valves to set an operational position of said select ones of the plurality of solenoid operated valves based on the input signals received from the dual track drive pedal and from the pressure transducers.

11. The pilot control module of claim 10, wherein the plurality of solenoid operated valves are in fluid communication with a main control valve of the tracked vehicle for controlling a distribution of hydraulic fluid power to each one of the pair of tracks from the hydraulic drive system such that manipulation of the joystick produces a steering movement in the pair of tracks.

12. The pilot control module of claim 10, further comprising a mode switch for toggling between a joystick steer off mode, and a joystick steer on mode, wherein the controller provides the output signal only in the joystick steer on mode.

13. The pilot control module of claim 12, wherein the mode switch is the dual track drive pedal such that manipulation of said dual track drive pedal toggles from the joystick steer off mode to the joystick steer on mode.

14. The pilot control module of claim 12, wherein the mode switch is a user manipulated switch separate from the dual track drive pedal.

15. The pilot control module of claim 10, wherein the controller is configured to only send the output signals based on the input signals from the pair of pressure transducers if said input signals from said pair of pressure transducers are received subsequently and concurrently with the input signal from the dual track drive pedal.

16. A method of installing a pilot control module in a tracked vehicle, the tracked vehicle having a pair of tracks movable independent of one another to cause movement of the tracked vehicle and a pair of drive pedals, wherein the pair of drive pedals are configured to provide a drive input to the pair of tracks to effectuate movement of the tracked vehicle, the tracked vehicle also including a joystick for controlling a function of the tracked vehicle, the method comprising:
  installing a pair of pressure transducers such that they detect a pressure input generated by a movement of the joystick and produce a corresponding input signal;
  installing a controller, said controller operably connected to the pair of pressure transducers to receive the input signal produced by said pressure transducers;
  associating the controller with a dual track drive pedal, said dual track drive pedal operably connected to the controller such that the controller receives an input signal produced by said dual track drive pedal; and
  installing a plurality of solenoid operated valves such that the solenoid operated valves are in fluid communication with a hydraulic drive system of the tracked vehicle, wherein the plurality of solenoid operated valves are in fluid communication with a main control valve of the tracked vehicle for controlling a distribution of hydraulic fluid power to each one of the pair of tracks from the hydraulic drive system such that manipulation of the joystick produces a steering movement in the pair of tracks.

17. The method of claim 16, wherein the step of installing the pair of pressure transducers includes disabling an existing function of the joystick.

18. The method of claim 16, wherein the step of associating the controller with a dual track drive pedal includes installing said dual track drive pedal in the tracked vehicle.

19. The method of claim 16, wherein the step of associating the controller with a dual track drive pedal includes connecting the controller to a pre-existing dual track drive pedal.

20. The method of claim 16, further comprising installing a plurality of isolation check valves such that each one of the plurality of isolation check valves is connected downstream from an outlet of each one of the plurality of solenoid operated valves, respectively.

* * * * *